(12) United States Patent
Bennett et al.

(10) Patent No.: US 6,822,171 B2
(45) Date of Patent: Nov. 23, 2004

(54) ARTICLE HANDLING SYSTEM

(75) Inventors: Robert Bennett, Walsall (GB);
Masahiko Muramiya, Kouga-gun (JP);
Michihiko Yonetsu, Kouga-gun (JP);
Takumi Kawamura, Oumihachiman (JP);
Ryoichi Sato, Kyoto (JP)

(73) Assignee: Ishida Co., Ltd., Kyoto (JP)

( * ) Notice: Subject to any disclaimer, the term of this patent is extended or adjusted under 35 U.S.C. 154(b) by 77 days.

(21) Appl. No.: 09/864,356

(22) Filed: May 25, 2001

(65) Prior Publication Data

US 2002/0007659 A1 Jan. 24, 2002

(30) Foreign Application Priority Data

May 26, 2000 (GB) .............................................. 0012994

(51) Int. Cl.$^7$ ........................ G01G 19/387; G01R 35/00
(52) U.S. Cl. .................................... 177/25.18; 324/202
(58) Field of Search ........................ 324/202; 177/25.18

(56) References Cited

U.S. PATENT DOCUMENTS

| | | | |
|---|---|---|---|
| 4,726,434 A | 2/1988 | Mosher | .................. 177/25.18 |
| 5,654,496 A * | 8/1997 | Thompson | ................... 324/202 |
| 5,659,247 A * | 8/1997 | Clements | ..................... 324/202 |

FOREIGN PATENT DOCUMENTS

| | | |
|---|---|---|
| EP | 0418069 A2 | 3/1991 |
| GB | 2235981 | 3/1991 |
| JP | 9-72885 | 3/1997 |

OTHER PUBLICATIONS

English language Abstract of Japanese Patent Publication 04006489.

* cited by examiner

Primary Examiner—Randy W. Gibson
(74) Attorney, Agent, or Firm—Staas & Halsey LLP

(57) ABSTRACT

An article handling system and method comprising a flow path along which articles travel and a metal detection system to detect the passage of metal items along the flow path. The system has a metal detector test system to support a metal test piece and positively move it along the flow path, and a metal detector to detect the metal test piece.

72 Claims, 8 Drawing Sheets

ARTICLE HANDLING SYSTEM

CROSS-REFERENCE TO RELATED APPLICATIONS

This application claims the benefit of British Application No. 0012994.0, filed May 26, 2000, in the British Patent Office, the disclosure of which is incorporated herein by reference.

BACKGROUND OF THE INVENTION

1. Field of the Invention

The present invention relates to an article handling system comprising a flow path along which articles travel and a metal detection system to detect the passage of metal items along the flow path. The invention also relates to a method to monitor the performance of a metal detection system.

2. Description of the Related Art

Metal detection systems are used in a wide range of article handling systems to monitor the presence of metal items, particularly those for handling foodstuffs. If a metal item is detected, the system must be stopped to enable the item to be extracted.

It is important to check the sensitivity and performance of the metal detection system. In conventional weighing systems in which articles such as potato chips are dropped generally vertically from a weighing machine to a packaging machine, the sensitivity of the metal detection system provided around the flow path is checked by dropping a metal test piece along the flow path. Conventionally, this has been done by manually dropping the test piece, which may be an iron or a stainless steel sphere, and determining whether or not the metal detection system senses the passage of the item. This is then repeated with spheres of different sizes. In view of the need to introduce the metal test piece into the flow path, it is conventional to stop the article handling system while the sensitivity check is carried out.

There are a number of problems with the conventional systems. One of the most significant is the need to recover the test piece after the test. This is often difficult to achieve and will result in significant waste of bags and the like while the test piece is located. It is therefore important to monitor the output from the article handling system to ensure that the metal piece can be retrieved.

Furthermore, particularly in the case of combination weighing machines, since the metal test piece is dropped through a relatively narrow opening, there is a risk that the test piece may be caught in the machine and will require significant time to be recovered. It is also important that the test piece passes a predetermined position to ensure that the sensitivity of the metal detection system is correctly adjusted. This is difficult to achieve with the conventional systems.

U.S. Pat. No. 4,726,434 describes a method of checking the sensitivity of a metal detection system provided around a discharge chute of a combination weighing machine. A metal test piece is supplied to one of the weighers of a combination weighing machine and the processor ensures that at the correct time, this particular weigher is involved in the combination which is released. Nevertheless, it is still necessary to recover the test piece and to stop the weighing machine following the test cycle.

SUMMARY OF THE INVENTION

Accordingly, it is an object of the present invention to provide an article handling system that overcomes the above disadvantages of the prior system. Additional objects and advantages will be set forth in part in the description which follows, and, in part, will be obvious from the description, or may be learned by practice of the invention.

The foregoing objects of the present invention are achieved by providing an article handling system comprising a flow path along which articles travel and a metal detection system having a metal detector to detect the passage of metal items along the flow path. A metal detector test system supporting a metal test piece is located relative to the flow path to move the test piece along the flow path past the metal detector in order to detect the sensitivity of the detector.

The foregoing objects may also be achieved with a method to monitor the performance of a metal detection system having a metal detector to detect the passage of metal items along a flow path of an article handling system that comprises controllably moving a metal test piece along the flow path and determining whether the metal detection system detects the metal test piece.

Unlike the known arrangements, the present metal detector test system supports the metal test piece and positively moves it along the flow path. The problem of recovery is eliminated since the metal test piece remains supported by the test system while the test piece is moved in a predetermined manner so that an accurate position of the test piece relative to the metal detection system is obtained.

Although the present method could be implemented while the article handling system is not operational, the metal test piece is moved along the flow path during normal operation of the article handling system. The advantage of this method is that typically, the articles themselves have some metallic qualities and therefore it is important that the metal detection system is not sensitive to the normal articles, but is still sensitive to the passage of rogue metal items. If the test is carried out in the absence of articles, then the metal detection system could be set at too sensitive a level. Of course, where the articles comprise (unwrapped) foodstuffs, it may be necessary to dispose of those articles which have passed along the flow path at the same time as the metal test piece. However, the advantage achieved by on-line monitoring exceeds this disadvantage.

The metal detector test system could be implemented in a number of different ways. For example, the test system may comprise a fluid operated cylinder coupled to a probe supporting the test piece, and a control system to control the supply of fluid to the cylinder to force the probe to move the test piece along the flow path. The cylinder could be pneumatically or hydraulically actuated.

In a second embodiment, the system comprises a linkage assembly comprising a number of links, pivoted together in a concertina arrangement, the test piece being supported on one of the links; and a control system to extend the linkage assembly to move the test piece along the flow path.

In a third embodiment, particularly where the flow path extends in a substantially vertical direction, the test system comprises an elongate flexible line which can be lowered along the flow path to carry the test piece and a control system to control the payout of the line.

In some cases, the metal test piece could remain in the flow path when not in use, even though it may contact the articles being handled. However, in many cases, this is undesirable and therefore preferably the metal detection test system is operable to move the test piece to a retracted position where it does not interfere with articles flowing along the flow path. In the case of a vertical flow path, this can be achieved by retracting the metal test piece to a position upstream of the point at which articles enter the flow path.

Typically, the parts of the metal detection test system which can be brought into the vicinity of the metal detection system are non-magnetic. This minimizes the risk that items other than the metal test piece are used to adjust the sensitivity of the metal detection system.

In general, the article handling system has a single metal detector test system. However, in some cases, more than one such system of either the same or different construction is provided. This enables the metal detector to be tested under different conditions without having to replace the test piece. For example, test pieces of different materials (iron, stainless steel, etc.) or different sizes could be provided on the different test systems.

The present invention is applicable to a wide variety of article handling systems, but is particularly suitable for use with weighing machines, and most particularly in combinational weighing apparatuses.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
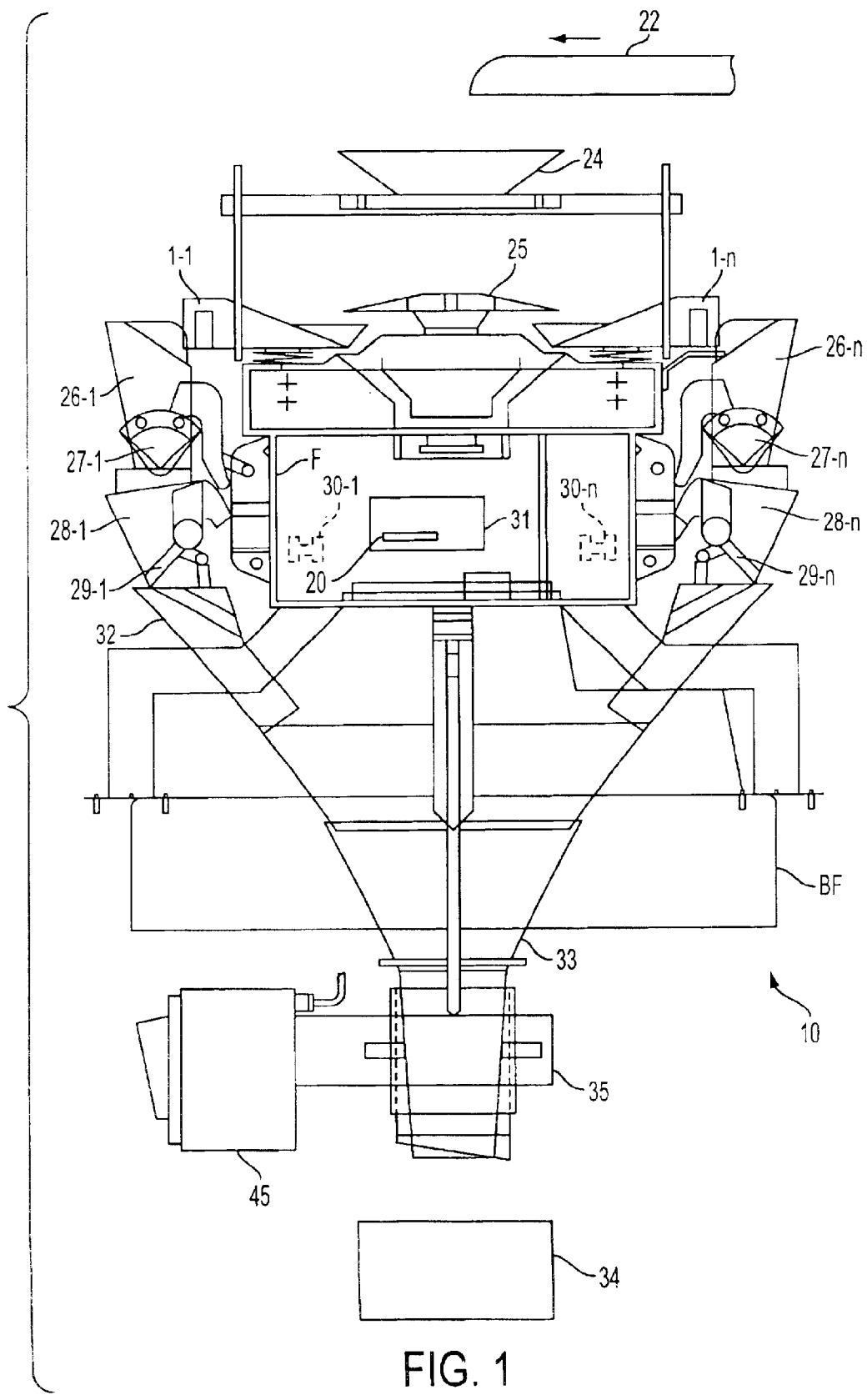
FIG. 1 is a schematic side view, partially cut away, of a first embodiment of the present invention.

Reference will now be made in detail to the present preferred embodiments of the present invention, examples of which are illustrated in the accompanying drawings, wherein like reference numerals refer to like elements throughout.

A combination weighing and counting apparatus 10 utilizing vibrating feeders is shown in a schematic side sectional representation in FIG. 1. The combination weighing and counting apparatus 10 is supported on a machine base frame BF, and articles transported by a supply conveyor 22 are supplied onto a center portion of a dispensing feeder 25 of a vibrating type through a supply chute 24. A number (n) of vibrating feeders 1 (1—1 to 1-n) are radially disposed around and in the vicinity of an outer periphery of the dispensing feeder 25 and are mounted on a frame F, which is in turn supported by the machine base frame BF, to receive articles dispensed radially outwardly from the dispensing feeder 25 while it is vibrated. The vibrating feeders 1 when vibrated at a predetermined amplitude and a predetermined frequency, cause the articles to move radially outwardly and then fall downward onto corresponding pool hoppers 26 (26-1 to 26-n) that are arranged in a circular row on the frame F at respective locations immediately below radially outer ends of the vibrating feeders 1.

The articles transported by the vibrating feeders 1 are, after having been temporarily pooled in pool hoppers 26 (26-1 to 26-n) and after discharge gates 27 (27-1 to 27-n) of some of the pool hoppers 26 that have been selected according to a weighing operation have been subsequently opened, supplied onto weighing hoppers 28 (28-1 to 28-n) that are also mounted on the frame F at respective locations immediately below and in alignment with the pool hoppers 26. The weight of the articles within each of the weighing hoppers 28 is measured by a corresponding weight detecting unit 30 (30-1 to 30-n) such as a load cell, from which a weight detection signal can be outputted. Based on this weight detection signal, a combination calculation is performed by a combination selecting unit 20 built in a control device. Some of the weighing hoppers 28, which result in the total weight of the articles in those weighing hoppers 28 that fall within a tolerance range determined based on a target weight, are selected, followed by opening of discharge gates 29 (29-1 to 29-n) corresponding to the selected weighing hoppers 28, with the articles consequently collected onto associated collecting chutes 32. The articles collected in the collecting chutes 32 are then discharged through a central chute 33 to a bagging or packaging machine 34 where they are packaged in a bag containing the articles of a total weight equal to or substantially equal to the target weight.

The weighing hoppers 28 that have been emptied as a result of the weighing operation perform subsequent weighing operations after the articles have been supplied from the pool hoppers 26 during the subsequent weighing, and the vibrating feeders 1 that have supplied the articles into the emptied pool hoppers 26 are simultaneously driven. After a predetermined quantity of articles have been supplied onto the pool hoppers 26, the associated vibrating feeders 1 terminate their delivery operation and are held in a stand-by state. The foregoing operation of the weighing and counting apparatus 10 is executed under the control of the control device 31. Located about a narrow portion of the central chute 33 is a metal detector 35 in the form of a coil coupled with detection electronics 45. The detection electronics 45 are connected to the control device 31.

Figure 2A:
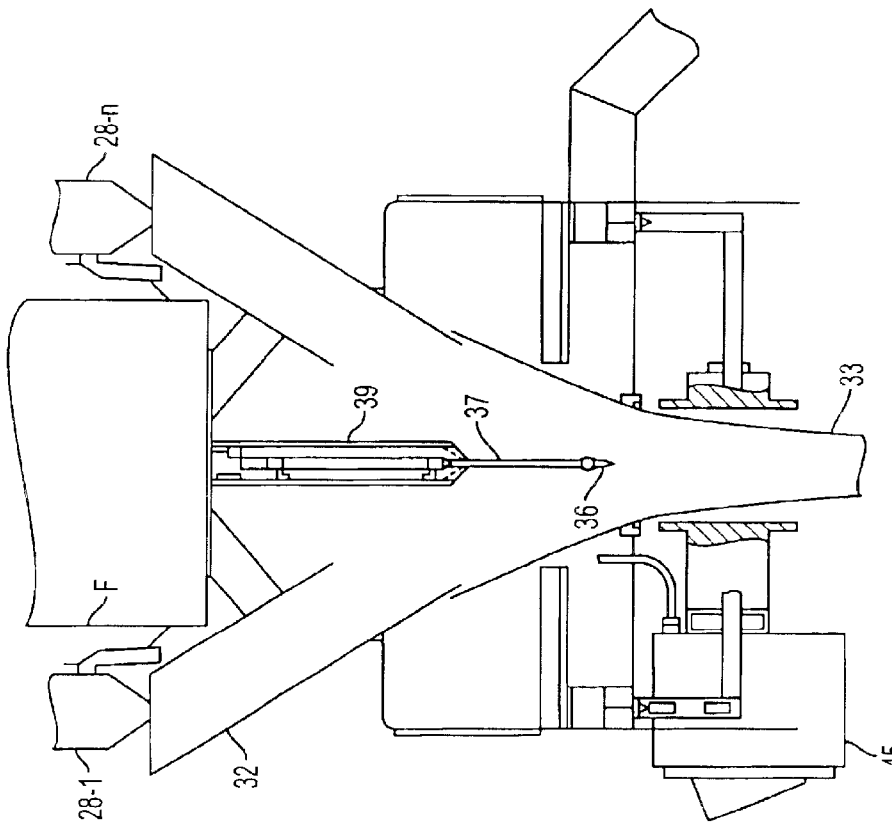
FIGS. 2A and 2B illustrate the metal detector test system of FIG. 1 in more detail and in two different positions.
Figure 2B:
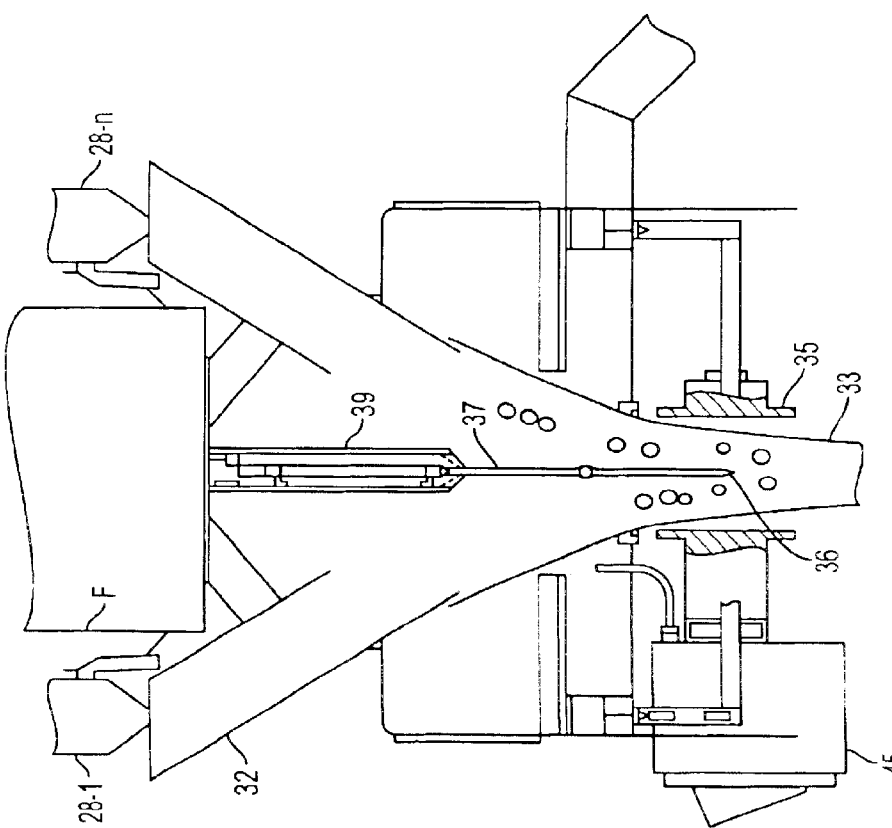
Figure 4:
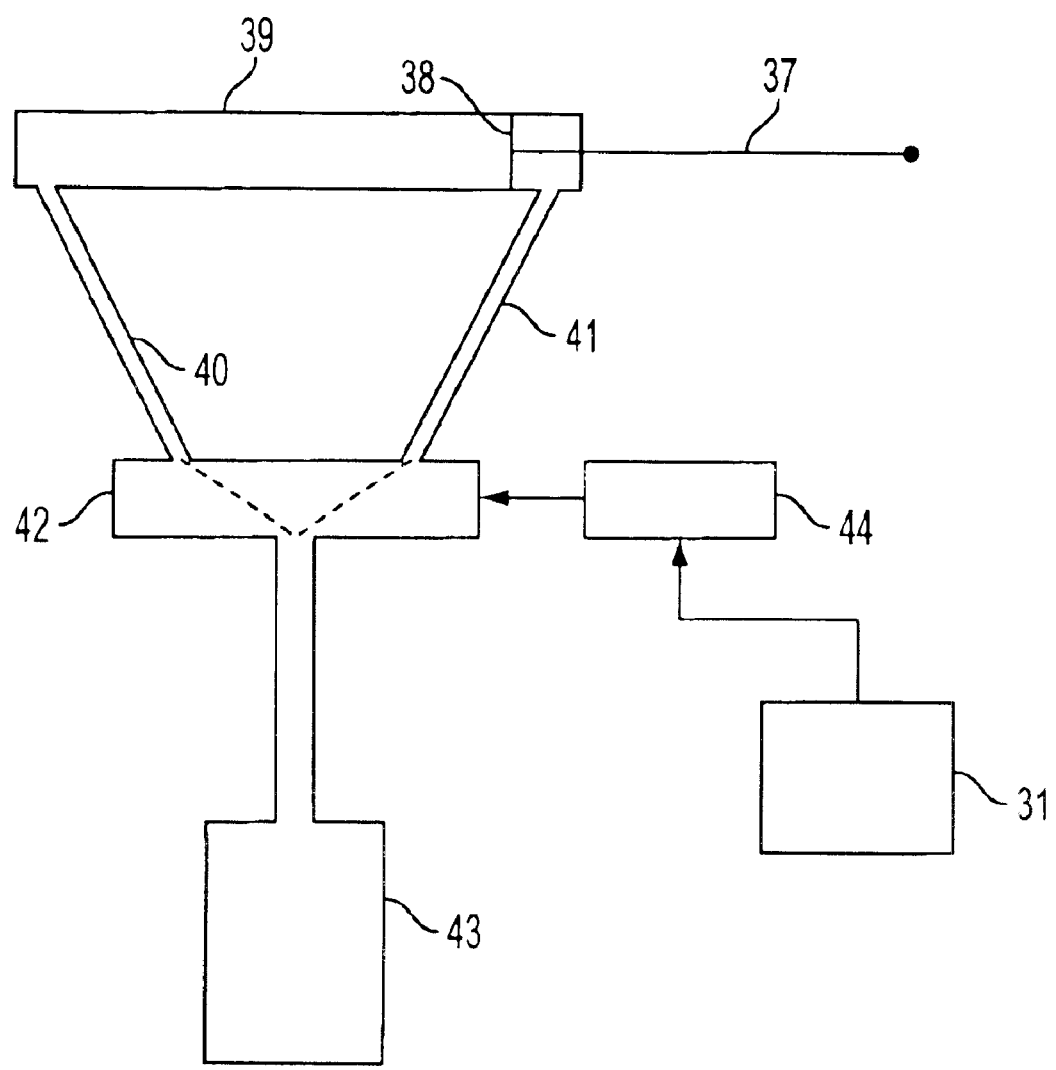
FIG. 4 is a schematic diagram of the control system of the present invention.

In order to test the sensitivity of the metal detector 35, a test piece 36 comprising small metal sphere is controllably moved into the central chute 33 in the vicinity of the metal detector 35 as can be seen in FIGS. 2A and 2B. This is achieved by connecting the metal sphere to a non-magnetic (typically acetal) probe 37 connected to a piston 38 (shown in FIG. 4) of a double acting piston/cylinder arrangement 39. As can be seen in FIG. 4, the cylinder 52 of the arrangement 39 is connected via tubes 40, 41 at respective ends to a valve 42 which in turn is connected to a compressed air source 43. By suitably controlling the valve 42, compressed air can be supplied either through the tube 40, to extend the probe 37 (as shown in FIG. 2A), or through the tube 41, to retract the probe 37 (as shown in FIG. 2B). The position of the valve 42 is controlled via a solenoid 44 connected to the control device 31. Other arrangements are possible, for example, the arrangement 39 could have a spring to bias the piston 38 towards one end and a single compressed air supply to act against the bias.

Figure 3:
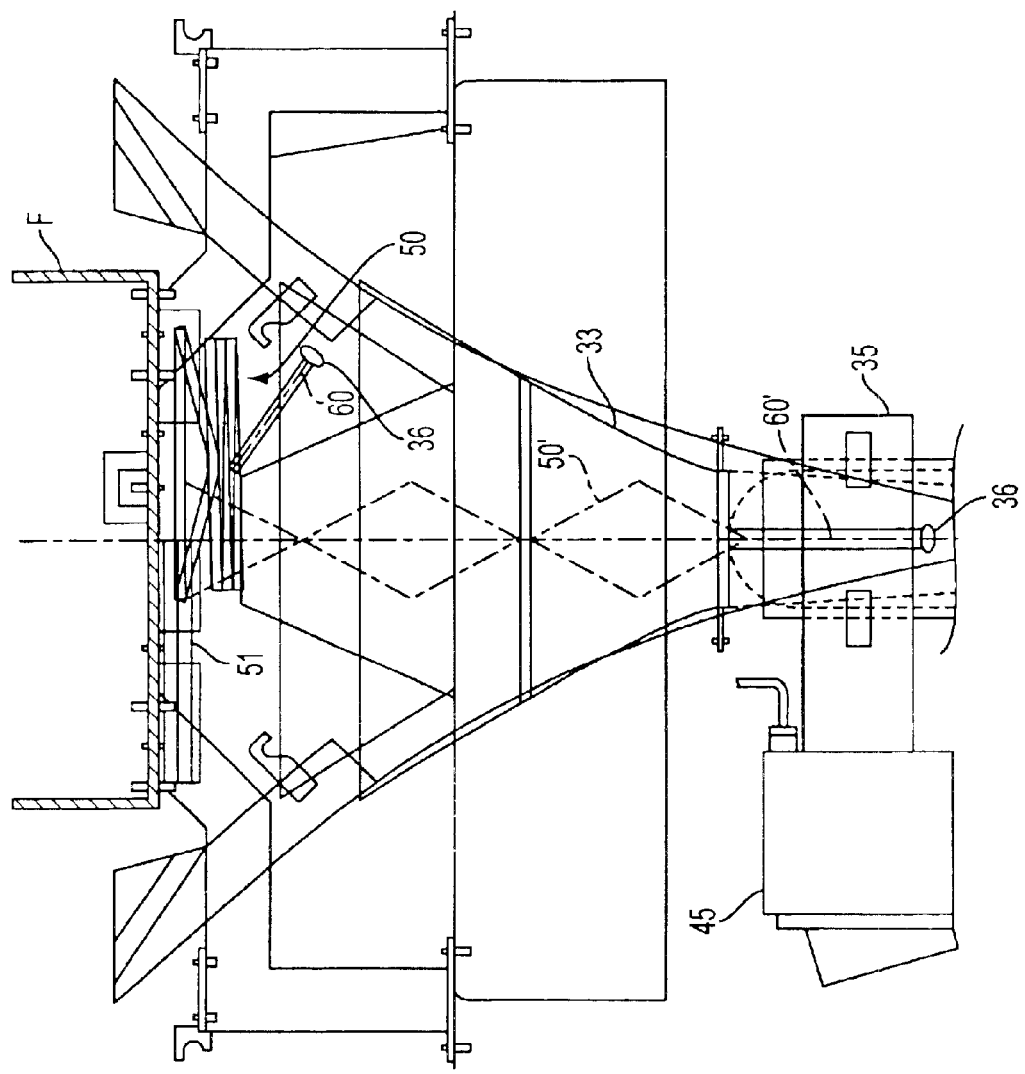
FIG. 3 is a schematic view of a second embodiment of the present invention.

FIG. 3 illustrates a modified embodiment in which the probe 37 is replaced by a "magic hand" or concertina arrangement of pivoted links 50 shown in solid lines in FIG.

Figure 6:
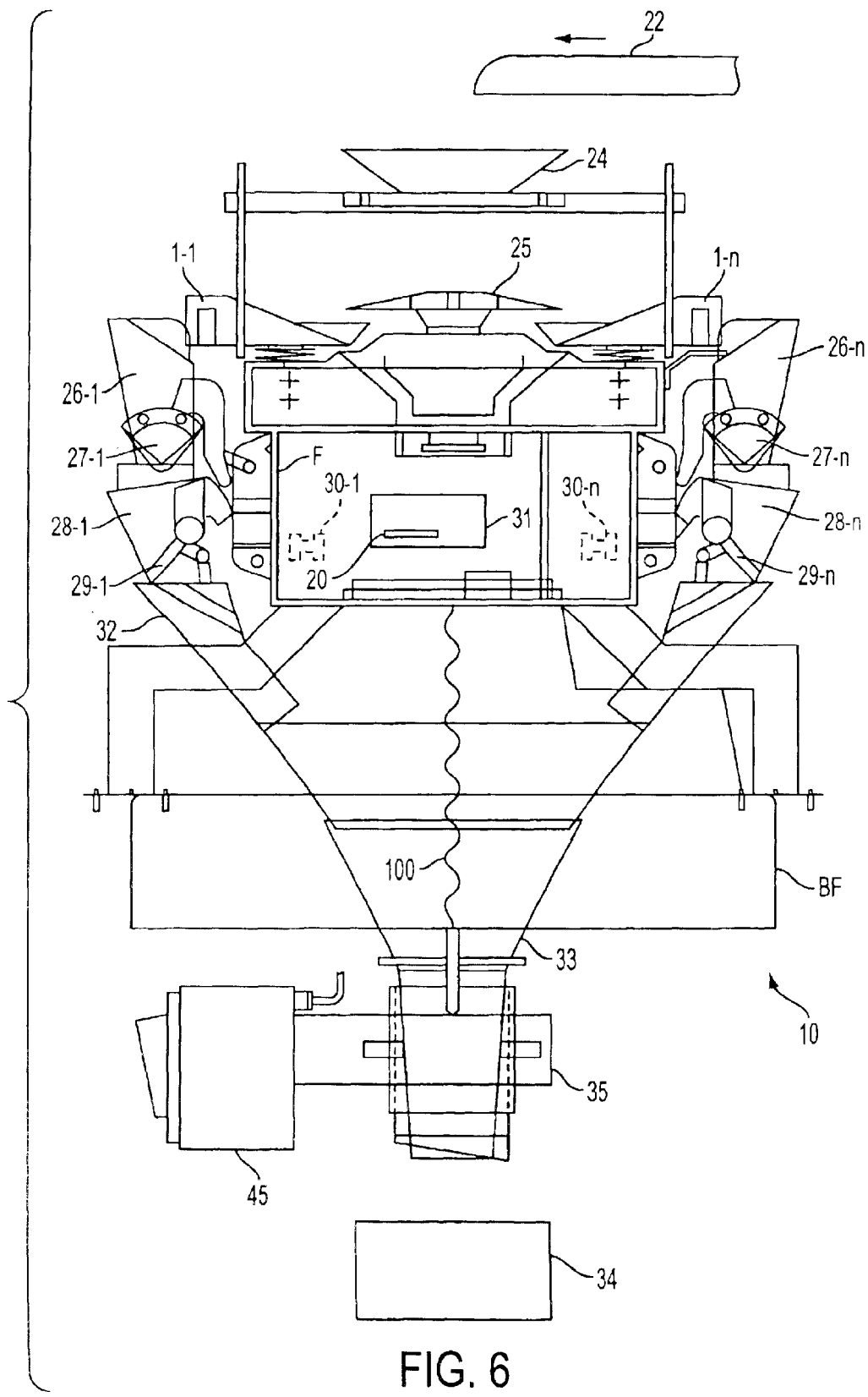
FIG. 6 is a schematic side view, partially cut away, of another embodiment of the present invention.

3 in their retracted position, and in chain dotted lines 50' in their extended position, with the test piece 36 below the metal detector 35. The position of the magic hand is controlled by a piston cylinder arrangement 51 of similar form to the arrangement 39. The metal test piece 36 is held on an arm 60 connected to the magic hand. FIG. 6 illustrates another embodiment, in which an elongate flexible line 100 is lowered along the path to carry the test piece.

Figure 5:
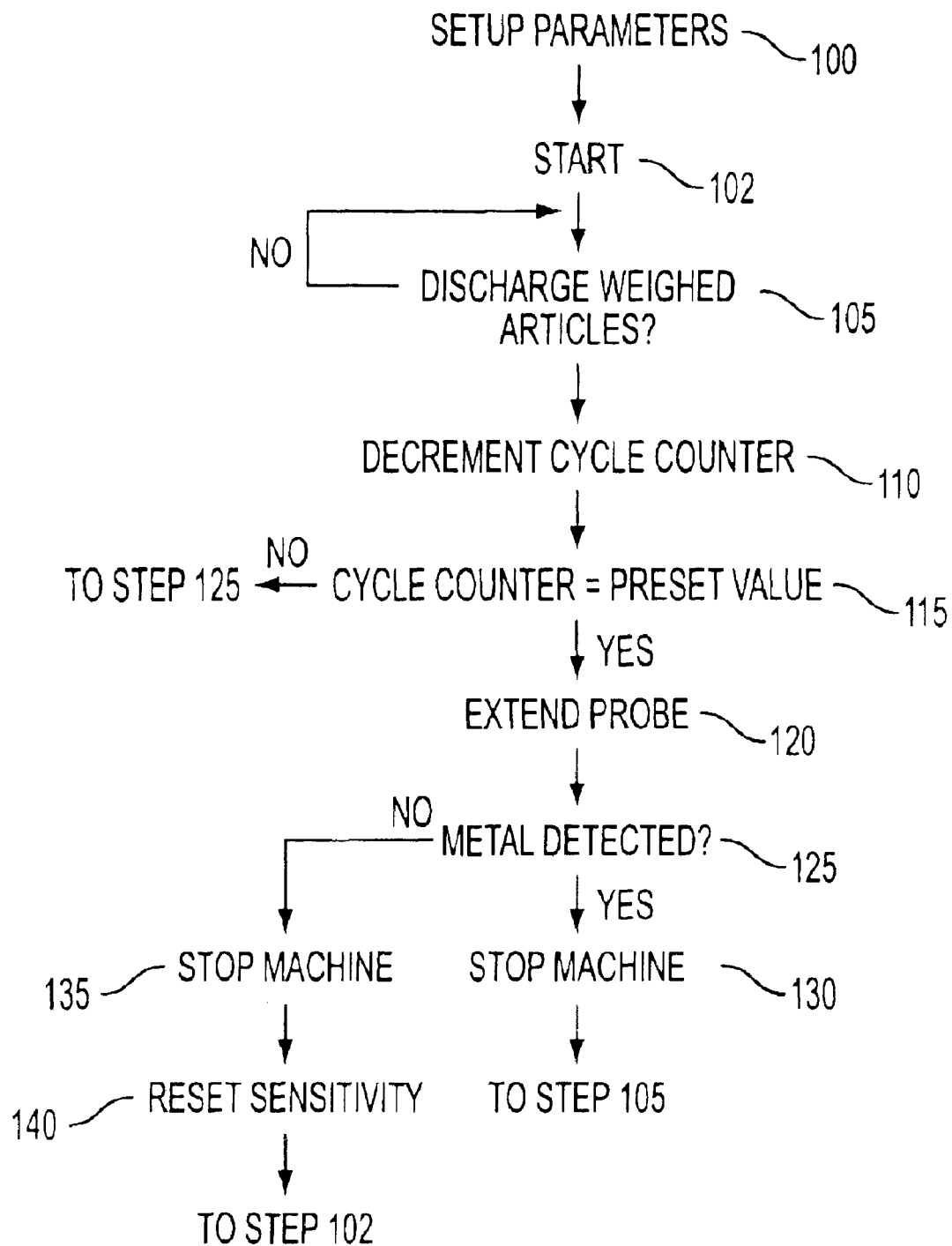
FIG. 5 is a flow chart illustrating the operation of the system shown in FIGS. 1 to 3.

The general operation of the embodiment shown in FIG. 1 is similar to the operation of the embodiment of FIGS. 3 and 6, and will now be described with reference to FIG. 5. Initially, various parameters must be set up (step 100). These include the time during which the test piece 36 is to be located in its extended position, the time to bring the test piece to the test position, and the frequency at which the test is to be carried out. Typically, this frequency will be based on either a specified time interval or, the case of a packaging machine, upon completion of a certain number of bags (or both). For example, the test might be run every 1000 bags in a typical potato chip weighing/packaging system. The system will then start and the following steps will be carried out by the control device 31. Initially, the device 31 determines whether or not weighed articles are being discharged (step 105). If they are, a cycle counter is decreased (step 110) and a comparison is made to determine whether the number of cycles since the last test is equal to the preset parameter (step 115). If it does, then the control device 31 actuates the solenoid 44 to connect the compressed air source 43 with the tube 40 to cause the probe 37 to move to its extended position shown in FIG. 2A (step 120). The probe is maintained in this position for the predetermined time and then retracted.

The control device 31 monitors the output from the electronics 45 to determine whether or not the presence of metal is detected (step 125). If it is, the control device 31 stops operation of the apparatus 10 (step 130). This is because at the same time the test piece 36 was brought to the extended position, another, rogue metal item may have been fed through the central chute 33. For safety, therefore, it is important that the machine is stopped. Once the operator has confirmed that the apparatus 10 is clear, he will restart it and processing returns to step 105.

If no metal is detected in step 125, then an error condition has arisen. Again, the machine will be stopped (step 135) allowing any rogue metal items to be removed while at the same time the control device 31 resets the sensitivity of the detection electronics 45 to a more sensitive setting (step 140) and processing returns to start step 102.

If a test cycle has not been reached in step 115, then the system will operate in a conventional manner to monitor the electronics 45 to sense for the presence of metal items and, if detected, to stop the machine in the same way as steps 135, 130. It will be noted that in this case, whenever the test 36 piece is detected, the packaging machine 34 stops.

Figure 7:
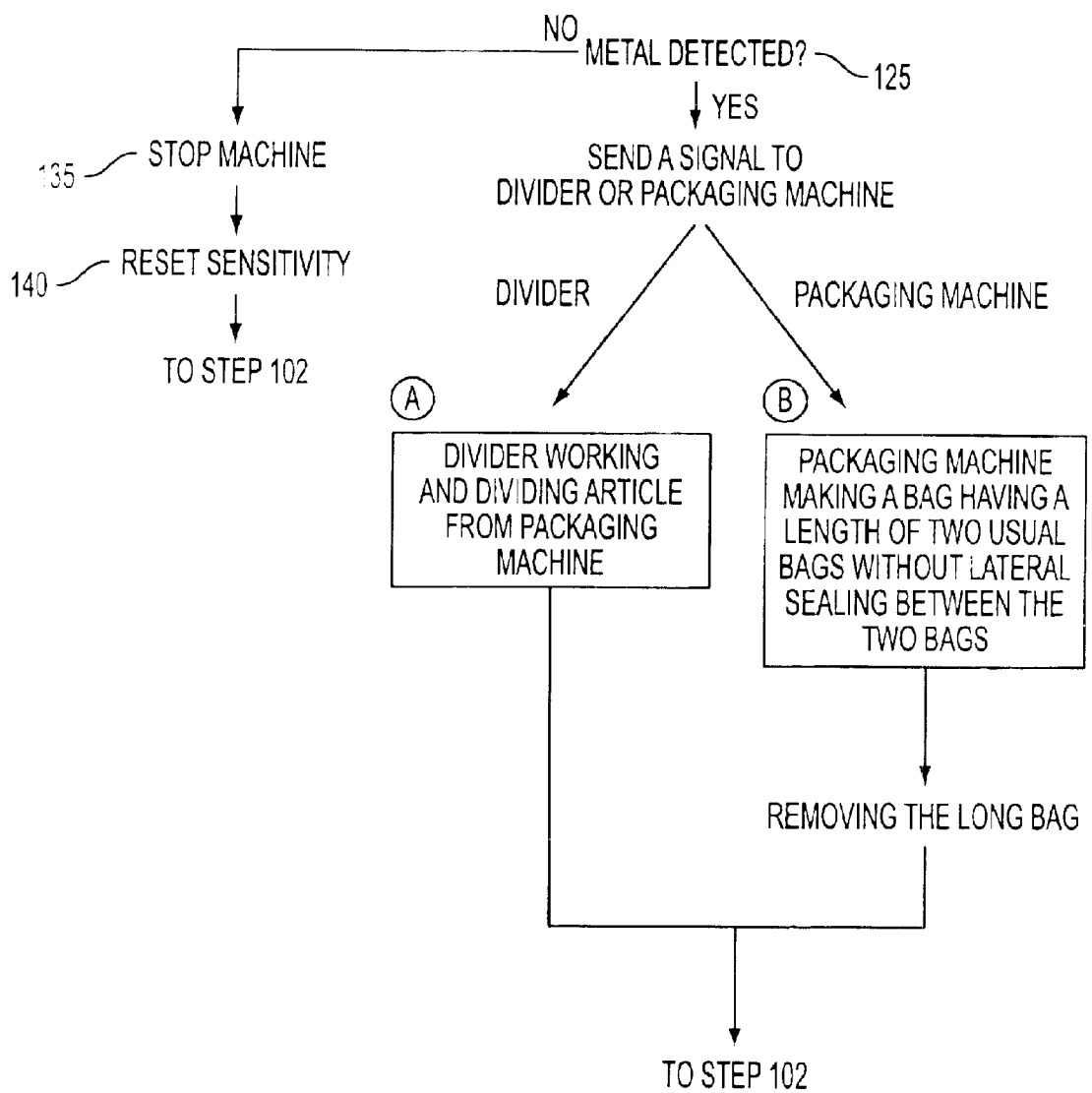
FIG. 7 is a flow chart illustrating the operation of an alternate embodiment of the present invention.

In the embodiment of FIG. 7, if metal is detected in step 125, then there are two options A, B which could be followed depending upon how the control device 31 is set up. In option A, a divider (not shown) is inserted into the chute 33 to prevent articles and any metal objects from passing into the currently formed package. The divider is then removed and processing returns to step 102.

In another option, option B, the control device 31 prevents a cutter within the packaging machine from operating on the current bag so that a double length bag is created. The next cut is made so that the double size bag is removed from the packaging machine and fed in a conventional manner to a check weigher (not shown) which not only monitors the weight of the bag but also checks its length. On sensing a double length bag, this will then be removed by blowing or pushing the bag off the feed line.

In a further option, the packaging machine could be stopped with the double length bag retained in its jaws. An operator can then remove the double length bag and then restart the packaging machine.

Figure 8:
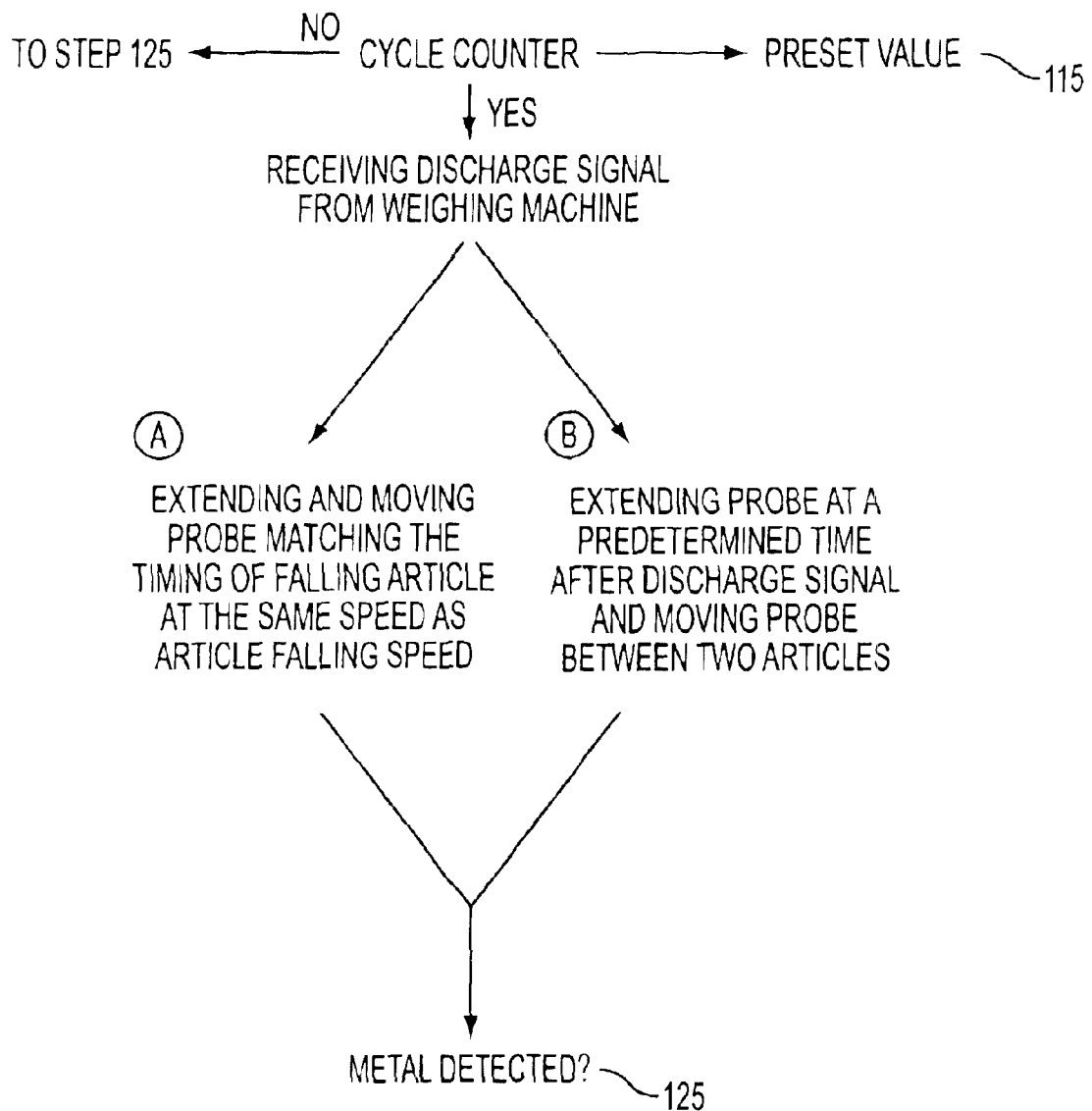
FIG. 8 is a flow chart illustrating the operation of still another embodiment of the present invention.

In some cases, the manner in which the probe 37 is extended in step 120 needs to be considered. Two options A, B are illustrated in FIG. 8. In option A, the probe is extended at a speed which matches the timing of the falling articles and the speed of those articles. Alternatively, in option B, the probe 37 is extended at a predetermined time after a discharge signal so that the probe is extended between the passage of successive articles, thus reducing the risk of any damage to those articles. Following option A, or option B, processing returns to step 125.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An article handling system comprising:
   a flow path along which articles travel; and
   a metal detection system having a metal detector to detect a metal item along the flow path, the metal detector having a metal detector test system to recoverably support a metal test piece, located relative to the flow path to move the test piece along the flow path in a first direction past the metal detector in order to detect a sensitivity of the metal detector and in a second direction to recover the test piece.

2. A system according to claim 1, wherein the metal detector test system comprises:
   a fluid operated cylinder coupled to a probe to support the test piece; and
   a control system to control a supply of a fluid to the cylinder to force the probe to move the test piece along the flow path.

3. An article handling system comprising:
   a flow path along which articles travel; and
   a metal detection system having a metal detector to detect a metal item along the flow path, the metal detector having a metal detector test system to recoverably support a metal test piece, located relative to the flow path to move the test piece along the flow path past the metal detector in order to detect a sensitivity of the metal detector, wherein the metal detector test system comprises:
   a linkage assembly comprising a plurality of links, pivoted together in a concertina arrangement, the test piece being supported on one of the links; and
   a control system to extend the linkage assembly to move the test piece along the flow path.

4. A system according to claim 1, wherein the flow path extends in a substantially vertical direction.

5. An article handling system comprising:
   a flow path along which articles travel; and
   a metal detection system having a metal detector to detect a metal item along the flow path, the metal detector having a metal detector test system to recoverably support a metal test piece, located relative to the flow path to move the test piece along the flow path past the metal detector in order to detect a sensitivity of the metal detector, wherein the flow path extends in a substantially vertical direction, wherein the metal detector test system comprises:

an elongate flexible line carrying the test piece, wherein the elongate flexible line is lowered along the flow path; and a control system to control a lowering of payout of the line.

6. A system according to claim 1 wherein the metal detector test system moves the test piece to a retracted position wherein the test piece does not interfere with the articles flowing along the flow path.

7. A system according to claim 6, wherein the retracted position is located upstream of a point of entry of the articles into the flow path.

8. A system according to claim 1, wherein parts of the metal detector test system which are in the vicinity of the metal detection system are non-magnetic.

9. A system according to claim 1 wherein the metal detector comprises a coil surrounding the flow path.

10. A system according to claim 1, further comprising a processing system, to monitor a result of moving the test piece past the metal detector and to adjust the sensitivity of the metal detection system.

11. A system according to claim 1, further comprising:

a combinational weighing apparatus including a plurality of article weighers, and a controller to pass articles in a selected combination of the weighers to be passed to the flow path when the combination satisfies a predetermined condition.

12. A method to monitor a performance of a metal detection system to detect a passage of metal items along a flow path of an article handling system, the method comprising:

recoverably supporting a metal test piece to move along the flow path in a detection direction and a recovery direction opposite to the detection direction; and determining whether the metal detection system detects the metal test piece when being moved in the detection direction; and recovering the metal piece comprising moving the metal test piece in the recovery direction with the article handling system.

13. A method according to claim 12, further comprising stopping the article handling system if the metal detection system does not detect the test piece.

14. A method according to claim 12, further comprising stopping the article handling system if the detection system detects the test piece.

15. A method according to claim 12, wherein the metal test piece is moved along the flow path during normal operation of the article handling system.

16. A method according to claim 12, wherein the metal detection system has a metal detector to detect the metal items along the flow path, the metal detector having a metal detector test system to support a metal test piece, located relative to the flow path to move the test piece along the flow path past the metal detector in order to detect a sensitivity of the metal detector.

17. An article handling system to move articles along a flow path, comprising:

a detection system comprising a detector, the detection system recoverably supporting a test piece to move along the flow path in a first direction in order to detect a sensitivity of the detector and in a second direction to recover the test piece.

18. A system according to claim 17, wherein the detector is a metal detector and the test piece is a metal test piece.

19. A system according to claim 17, wherein the detection system comprises a probe to support the test piece.

20. A system according to claim 19, wherein the detection system moves the test piece along the flow path by moving the probe between an extended and a retracted position.

21. An article handling system to move articles along a flow path, comprising:

a detection system comprising a detector, the detection system recoverably supporting a test piece to move along the flow path in order to detect a sensitivity of the detector, wherein the detection system comprises a linkage assembly to support the test piece.

22. An article handling system to move articles along a flow path, comprising:

a detection system comprising a detector, the detection system recoverably supporting a test piece to move along the flow path in order to detect a sensitivity of the detector, wherein the detection system comprises a flexible line to support the test piece.

23. A system according to claim 17, wherein the test piece remains supported by the detection system after detecting the sensitivity of the detector.

24. A system according to claim 17, wherein the test piece is moved along the flow path during a normal operation of the system.

25. A method to detect a sensitivity of a detector of an article handling system, comprising:

recoverably supporting a test piece to move along a flow path of the article handling system in a detection direction from a first position to a second position;

determining whether the test piece is detected; and moving the test piece in a recovery direction opposite the detection direction from the second position to the first position.

26. A method according to claim 25, wherein the system positively moves the test piece from the first position to the second position.

27. A method according to claim 26, wherein the system positively moves the test piece from the second position to the first position.

28. The method of claim 27, further comprising stopping the system if the test piece is detected.

29. The method of claim 28, further comprising resetting the sensitivity of the detector if the test piece is not detected.

30. An apparatus to move articles along a flow path, comprising a detector to detect a test piece while moving the test piece along the flow path in a detection direction, wherein it is not necessary to stop the apparatus after detecting the test piece in order to recover the test piece by moving the test piece along the flow path in a recovery direction opposite the detection direction.

31. An apparatus to move articles along a flow path, comprising a detector to detect a test piece while moving the test piece in a detection direction, wherein the test piece is recoverably supported to be moved along the flow path during a normal operation of the apparatus by moving the test piece in a recovery direction opposite the detection direction.

32. An apparatus according to claim 17, wherein the test piece is positively moved along the flow path by the detection system.

33. An apparatus comprising:
a combinational weigher weighing articles; and
a detection system comprising a detector, the detection system recoverably supporting a test piece while the test piece is moved along a flow path of the articles in a recovery direction, and to move the test piece through the weigher along the flow path in a direction opposite to the recovery direction in order to detect a sensitivity of the detector.

34. A system according to claim 33, wherein the detector is a metal detector and the test piece is a metal test piece.

35. An apparatus comprising:
a combinational weigher weighing articles; and
a detection system comprising a detector, the detection system recoverably supporting a test piece to move along a flow path of the articles through the weigher in order to detect a sensitivity of the detector, wherein the detector is a metal detector and the test piece is a metal test piece, wherein the detection system comprises a probe to support the test piece.

36. A system according to claim 35, wherein the detection system moves the test piece along the flow path by moving the probe between an extended and a retracted position.

37. An apparatus comprising:
a combinational weigher weighing articles; and
a detection system comprising a detector, the detection system recoverably supporting a test piece to move along a flow path of the articles through the weigher in order to detect a sensitivity of the detector, wherein the detection system comprises a linkage assembly to support the test piece.

38. An apparatus comprising:
a combinational weigher weighing articles; and
a detection system comprising a detector, the detection system recoverably supporting a test piece to move along a flow path of the articles through the weigher in order to detect a sensitivity of the detector, wherein the detection system comprises a flexible line to support the test piece.

39. An apparatus comprising:
means for weighing articles and for selecting a combination of the weighed articles which satisfies a predetermined weight condition; and
a detection system comprising a detector, the detection system recoverably supporting a test piece while the test piece is moved along a flow path of the articles in a recovery direction, and to move test piece through said means for weighing articles along the flow path in a direction opposite to the recovery direction in order to detect a sensitivity of the detector.

40. A system according to claim 39, wherein the detector is a metal detector and the test piece is a metal test piece.

41. An apparatus comprising:
means for weighing articles and for selecting a combination of the weighed articles which satisfies a predetermined weight condition; and
a detection system comprising a detector, the detection system recoverably supporting a test piece to move along a flow path of the articles through said means for weighing articles in order to detect a sensitivity of the detector, wherein the detection system comprises a probe to support the test piece.

42. An apparatus comprising:
means for weighing articles and for selecting a combination of the weighed articles which satisfies a predetermined weight condition; and
a detection system comprising a detector, the detection system recoverably supporting a test piece to move along a flow path of the articles through said means for weighing articles in order to detect a sensitivity of the detector, wherein the detector is a metal detector and the test piece is a metal test piece, wherein the detection system moves the test piece along the flow path by moving the probe between an extended and a retracted position.

43. An apparatus comprising:
means for weighing articles and for selecting a combination of the weighed articles which satisfies a predetermined weight condition; and
a detection system comprising a detector, the detection system recoverably supporting a test piece to move along a flow path of the articles through said means for weighing articles in order to detect a sensitivity of the detector, wherein the detection system comprises a linkage assembly to support the test piece.

44. An apparatus comprising:
means for weighing articles and for selecting a combination of the weighed articles which satisfies a predetermined weight condition; and
a detection system comprising a detector, the detection system recoverably supporting a test piece to move along a flow path of the articles through said means for weighing articles in order to detect a sensitivity of the detector, wherein the detection system comprises a flexible line to support the test piece.

45. An apparatus comprising:
a combinational weigher including weighing units, each weighing unit weighing articles contained therein, and
a selector selecting a combination of the weighing units less than the total number of weighing units which together contain weighed articles that satisfy a predetermined weight condition, the weighing units of the selected combination being controlled to dispense the weighed articles contained therein while the remaining weighing units hold weighed articles contained by said remaining weighing units, the dispensed articles traveling along a flow path through the combinational weigher to be output from the combinational weigher; and
a detection system comprising a detector, the detection system recoverably supporting a test piece while the test piece is moved along the flow path in a recovery direction, and to move the test piece along the flow path in a direction opposite to the recovery direction in order to detect a sensitivity of the detector.

46. A system according to claim 45, wherein the detector is a metal detector and the test piece is a metal test piece.

47. An apparatus comprising:
a combinational weigher including weighing units, each weighing unit weighing articles contained therein, and
a selector selecting a combination of the weighing units less than the total number of weighing units which together contain weighed articles that satisfy a predetermined weight condition, the weighing units of the selected combination being controlled to dispense the weighed articles contained therein while the remaining weighing units hold weighed articles contained by said remaining weighing units, the dispensed articles traveling along a flow path through the combinational weigher to be output from the combinational weigher; and
a detection system comprising a detector, the detection system recoverably supporting a test piece to move along the flow path in order to detect a sensitivity of the detector, wherein the detection system comprises a probe to support the test piece.

48. A system according to claim 47 wherein the detection system moves the test piece along the flow path by moving the probe between an extended and a retracted position.

49. An apparatus comprising:
a combinational weigher including weighing units, each weighing unit weighing articles contained therein, and
a selector selecting a combination of the weighing units less than the total number of weighing units which together contain weighed articles that satisfy a predetermined weight condition, the weighing units of the selected combination being controlled to dispense the weighed articles contained therein while the remaining weighing units hold weighed articles contained by said remaining weighing units, the dispensed articles traveling along a flow path through the combinational weigher to be output from the combinational weigher; and
a detection system comprising a detector, the detection system recoverably supporting a test piece to move along the flow path in order to detect a sensitivity of the detector, wherein the detection system comprises a linkage assembly to support the test piece.

50. An apparatus comprising:
a combinational weigher including weighing units, each weighing unit weighing articles contained therein, and
a selector selecting a combination of the weighing units less than the total number of weighing units which together contain weighed articles that satisfy a predetermined weight condition, the weighing units of the selected combination being controlled to dispense the weighed articles contained therein while the remaining weighing units hold weighed articles contained by said remaining weighing units, the dispensed articles traveling along a flow path through the combinational weigher to be output from the combinational weigher; and
a detection system comprising a detector, the detection system recoverably supporting a test piece to move along the flow path in order to detect a sensitivity of the detector, wherein the detection system comprises a flexible line to support the test piece.

51. The system of claim 33, further comprising a divider to separate the test piece from the articles.

52. The system of claim 33, further comprising:
a packaging machine to package the articles in bags; and
a detector to detect a size of the bags.

53. The system of claim 36, wherein the probe is moved to the extended position at a falling speed of the articles.

54. The system of claim 36, wherein the probe is extended at a predetermined time after receiving a discharge signal, thereby extending the probe between a passage of successive articles.

55. An article handling system comprising:
a flow path along which articles travel; and
a metal detection system having a metal detector to detect a metal item along the flow path, the metal detector having a metal detector test system to support a metal test piece, located relative to the flow path to move the test piece along the flow path past the metal detector in order to detect a sensitivity of the metal detector, wherein the metal detector test system comprises:
a linkage assembly comprising a plurality of links, pivoted together in a concertina arrangement, the test piece being supported on one of the links, and
a control system to extend the linkage assembly to move the test piece along the flow path.

56. An article handling system comprising:
a flow path along which articles travel; and
a metal detection system having a metal detector to detect a metal item along the flow path, the metal detector having a metal detector test system to support a metal test piece, located relative to the flow path to move the test piece along the flow path past the metal detector in order to detect a sensitivity of the metal detector,
wherein the flow path extends in a substantially vertical direction, and the metal detector test system comprises:
an elongate flexible line carrying the test piece, wherein the elongate flexible line is lowered along the flow path, and
a control system to control a lowering of payout of the line.

57. An article handling system to move articles along a flow path, comprising:
a detection system comprising a detector, the detection system moving a test piece along the flow path in order to detect a sensitivity of the detector, wherein the detection system comprises a linkage assembly to support the test piece.

58. An article handling system to move articles along a flow path, comprising:
a detection system comprising a detector, the detection system moving a test piece along the flow path in order to detect a sensitivity of the detector, wherein the detection system comprises a flexible line to support the test piece.

59. An apparatus comprising:
a combinational weigher weighing articles; and
a detection system comprising a detector, the detection system moving a test piece along a flow path of the articles through the weigher in order to detect a sensitivity of the detector, wherein the detector is a metal detector and the test piece is a metal test piece, and
the detection system comprises a probe to support the test piece.

60. A system according to claim 59, wherein the detection system moves the test piece along the flow path by moving the probe between an extended and a retracted position.

61. An apparatus comprising:
a combinational weigher weighing articles; and
a detection system comprising a detector, the detection system moving a test piece along a flow path of the articles through the weigher in order to detect a sensitivity of the detector, wherein the detection system comprises a linkage assembly to support the test piece.

62. An apparatus comprising:
a combinational weigher weighing articles; and
a detection system comprising a detector, the detection system moving a test piece along a flow path of the articles through the weigher in order to detect a sensitivity of the detector,
wherein the detection system comprises a flexible line to support the test piece.

63. An apparatus comprising:
means for weighing articles and for selecting a combination of the weighed articles which satisfies a predetermined weight condition; and
a detection system comprising a detector, the detection system moving a test piece along a flow path of the articles through said means for weighing articles in order to detect a sensitivity of the detector, wherein the detection system comprises a probe to support the test piece.

64. An apparatus comprising:

means for weighing articles and for selecting a combination of the weighed articles which satisfies a predetermined weight condition; and a detection system comprising a detector, the detection system moving a test piece along a flow path of the articles through said means for weighing articles in order to detect a sensitivity of the detector, wherein the detector is a metal detector and the test piece is a metal test piece, and the detection system moves the test piece along the flow path by moving the probe between an extended and a retracted position.

65. An apparatus comprising:

means for weighing articles and for selecting a combination of the weighed articles which satisfies a predetermined weight condition; and a detection system comprising a detector, the detection system moving a test piece along a flow path of the articles through said means for weighing articles in order to detect a sensitivity of the detector, wherein the detection system comprises a linkage assembly to support the test piece.

66. An apparatus comprising:

means for weighing articles and for selecting a combination of the weighed articles which satisfies a predetermined weight condition; and a detection system comprising a detector, the detection system moving a test piece along a flow path of the articles through said means for weighing articles in order to detect a sensitivity of the detector, wherein the detection system comprises a flexible line to support the test piece.

67. An apparatus comprising:

a combinational weigher including weighing units, each weighing unit weighing articles contained therein, and a selector selecting a combination of the weighing units less than the total number of weighing units which together contain weighed articles that satisfy a predetermined weight condition, the weighing units of the selected combination being controlled to dispense the weighed articles contained therein while the remaining weighing units hold weighed articles contained by said remaining weighing units, the dispensed articles traveling along a flow path through the combinational weigher to be output from the combinational weigher; and a detection system comprising a detector, the detection system moving a test piece along the flow path in order to detect a sensitivity of the detector, wherein the detection system comprises a probe to support the test piece.

68. A system according to claim 67, wherein the detection system moves the test piece along the flow path by moving the probe between an extended and a retracted position.

69. An apparatus comprising:

a combinational weigher including weighing units, each weighing unit weighing articles contained therein, and a selector selecting a combination of the weighing units less than the total number of weighing units which together contain weighed articles that satisfy a predetermined weight condition, the weighing units of the selected combination being controlled to dispense the weighed articles contained therein while the remaining weighing units hold weighed articles contained by said remaining weighing units, the dispensed articles traveling along a flow path through the combinational weigher to be output from the combinational weigher; and a detection system comprising a detector, the detection system moving a test piece along the flow path in order to detect a sensitivity of the detector, wherein the detection system comprises a linkage assembly to support the test piece.

70. An apparatus comprising:

a combinational weigher including weighing units, each weighing unit weighing articles contained therein, and a selector selecting a combination of the weighing units less than the total number of weighing units which together contain weighed articles that satisfy a predetermined weight condition, the weighing units of the selected combination being controlled to dispense the weighed articles contained therein while the remaining weighing units hold weighed articles contained by said remaining weighing units, the dispensed articles traveling along a flow path through the combinational weigher to be output from the combinational weigher; and a detection system comprising a detector, the detection system moving a test piece along the flow path in order to detect a sensitivity of the detector, wherein the detection system comprises a flexible line to support the test piece.

71. The system of claim 60, wherein the probe is moved to the extended position at a falling speed of the articles.

72. The system of claim 71, wherein the probe is extended at a predetermined time after receiving a discharge signal, thereby extending the probe between a passage of successive articles.

* * * * *

UNITED STATES PATENT AND TRADEMARK OFFICE
CERTIFICATE OF CORRECTION

PATENT NO.    : 6,822,171 B2
DATED         : November 23, 2004
INVENTOR(S)   : Bennett et al.

It is certified that error appears in the above-identified patent and that said Letters Patent is hereby corrected as shown below:

Column 7,
Lines 11 and 21, insert -- , -- after "claim 1".
Line 47, insert -- the -- after "move".

Signed and Sealed this

Thirty-first Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,822,171 B2
DATED : November 23, 2004
INVENTOR(S) : Bennett et al.

It is certified that error appears in the above-identified patent and that said Letters Patent is hereby corrected as shown below:

Column 9,
Line 47, insert -- the -- after "move".

Signed and Sealed this

Twenty-third Day of August, 2005

JON W. DUDAS
*Director of the United States Patent and Trademark Office*